2,806,052

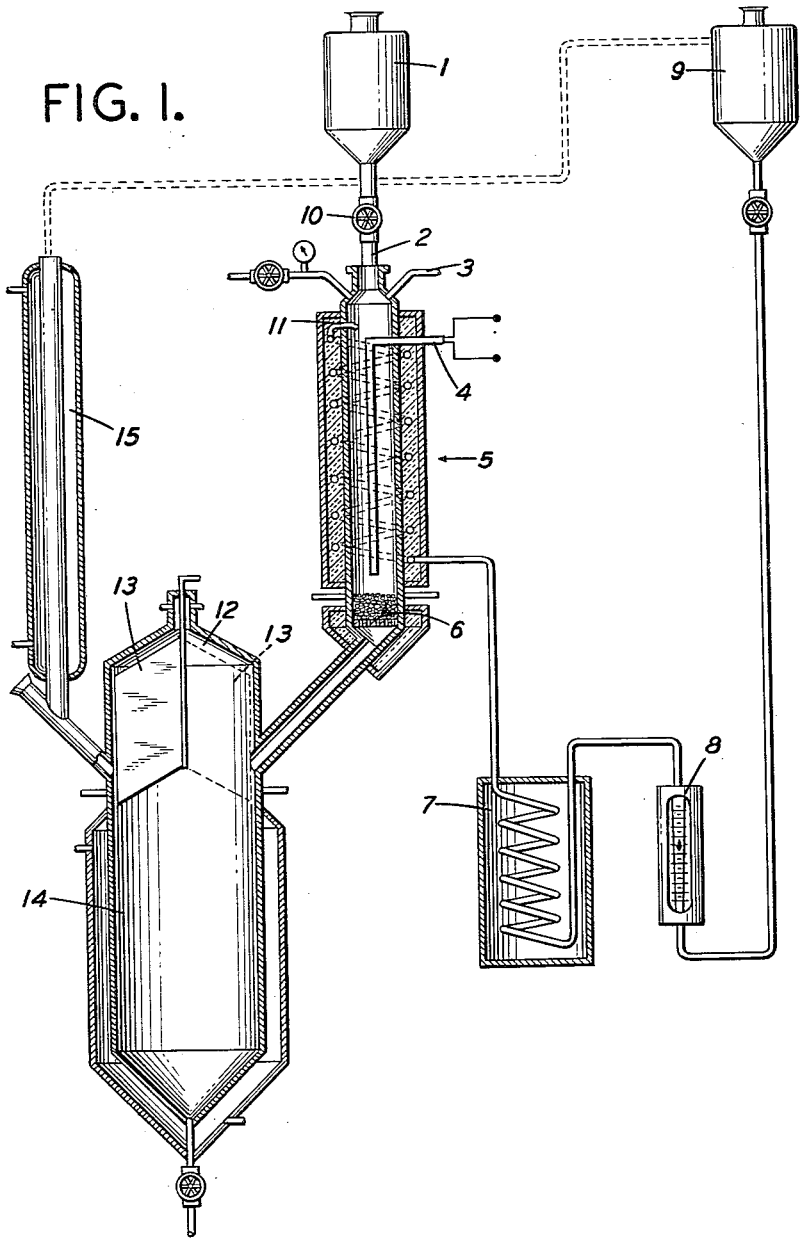
Sept. 10, 1957 E. SIGGEL 2,806,052
PROCESS OF ESTERIFYING DICARBOXYLIC ACIDS HAVING HIGH
BOILING POINTS OR DECOMPOSITION POINTS WITH MONO- OR
POLY-HYDRIC ALCOHOLS
Filed April 20, 1953 2 Sheets-Sheet 1
FIG. I.
INVENTOR
ERHARD SIGGEL
BY
HIS ATTORNEY.

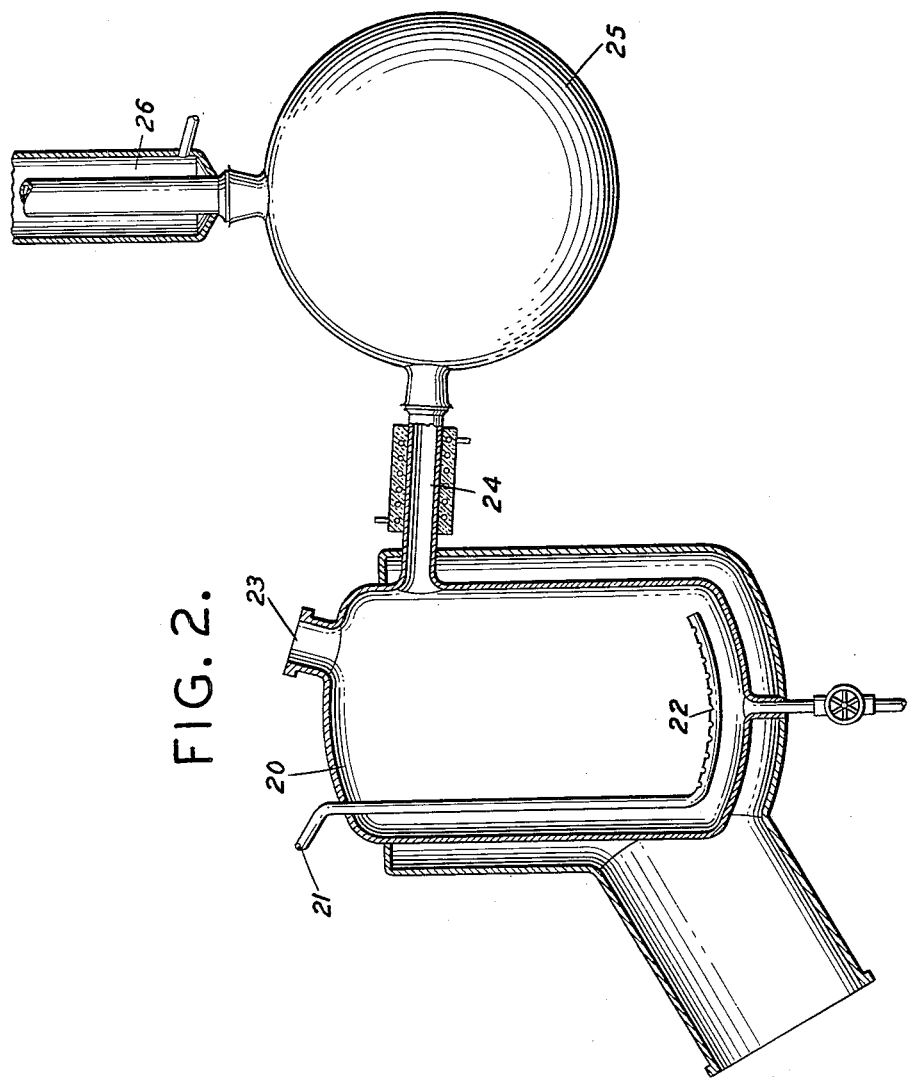

PROCESS OF ESTERIFYING DICARBOXYLIC ACIDS HAVING HIGH BOILING POINTS OR DECOMPOSITION POINTS WITH MONO- OR POLY-HYDRIC ALCOHOLS

Erhard Siggel, Kleinwallstadt (Main), Germany, assignor to Vereinigte Glanzstoff-Fabriken A. G., Wuppertal-Elberfeld, Germany, a corporation of Germany Application April 20, 1953, Serial No. 349,782
Claims priority, application Germany April 21, 1952
10 Claims. (Cl. 260—475)

This invention relates to a method of esterifying dicarboxylic acids having high boiling points or decomposition temperatures.

It is known that the esterification of dicarboxylic acids can be carried out in the presence of excess alcohol. Such esterification can also be carried out in the presence of solvents, if necessary, with the assistance of azeotropic distillations. It is further known that esterifications can be carried out by vaporizing low boiling carboxylic acids together with alcohols, such esterifications being carried out in a reaction chamber at the elevated vaporization temperatures of those reactants. However, dicarboxylic acids which are difficult to dissolve, or do not dissolve at all in the alcohols used as the esterification component or in other solvents, can be esterified only when they are maintained in the form of suspensions during prolonged reaction periods. For example, the esterification of terephthalic acid which, as is well known, has no melting point and no boiling point and which is practically insoluble in all solvents, requires an esterification period of more than 20 hours and a very large excess of the alcohols.

It has now been found that dicarboxylic acids which are difficult to dissolve or are practically insoluble, can be esterified during short reaction periods to produce esters of high purity in good yields without need to dissolve the dicarboxylic acids. Such esterification, it has been discovered, can be accomplished by introducing the solid dicarboxylic acid, together with a liquid or solid catalyst if necessary into a heated reaction chamber, and conducting the appropriate alcohol, in the vapor phase, through the mixture at temperatures of between 100° and 310° C. If those alcohols possess comparatively low boiling points, it has been found advisable to heat them to the desired reaction temperature prior to the introduction thereof into the reaction vessel. The method of the instant invention is suitable not only for the manufacture of esters from monohydric alcohols but also for polyhydric alcohols when steps or precautions are taken to prevent the occurrence of polycondensations during the course of the reaction. Such polycondensation can be prevented by using an excess of the polyhydric alcohol. The catalyst must not be volatile within the temperature range in which the reaction takes place.

Suitable catalysts are boro phosphates, phosphoric acid, phosphoric acid-carbon and zinc chloride. The distillation or the sublimation of the ester formed is enhanced by the highly heated vapor of the alcohol which is conducted through the reaction mixture and is partly carried along by the ester that is formed. The reaction product can be freed from the alcohol carried along by the ester in any well known or conventional manner as through distillation or filtration.

During the reaction there are formed, as by-products, ethers of the alcohols employed; and they may be recovered from the reaction product and returned into the reaction system as esterifying agents.

In the accompanying drawings there are shown illustrative arrangements of apparatus for carrying out esterifications in accordance with the principles of this invention.

In the drawings:

Fig. 1 is a diagrammatic representation of one form of apparatus adapted for carrying out an esterification.

Fig. 2 is a diagrammatic representation of another form of apparatus adapted for carrying out an esterification.

The following are illustrative examples of esterifications carried out in accordance with the principles of this invention.

Example 1

Employing the apparatus shown diagrammatically in Fig. 1, for the manufacture of dimethyl terephthalate, 500 parts of terephthalic acid, coarsely granulated or in the form of compressed pellets, are wetted or moistened with 50 parts of phosphoric acid and fed from a container 1 through a wide feeder 10 to a jacketed reaction chamber 5 heated to 250° C. The reaction chamber 5 is closed at its bottom end by a perforated plate 6 covered with a layer or bed of activated carbon. The chamber 5 communicates through a short, heated pipe with the collection chamber 12.

The methanol required for the esterification of the terephthalic acid is fed, at the rate of 140 parts per hour, from a container 9 through a regulator, as for example a rotameter 8, to an evaporator 7. The vaporized methanol then passes through a superheating coil housed within the jacket of the reaction chamber and is then fed, as at 11, to the head of the reaction chamber in the form of superheated vapors at a temperature of about 250° C. The apparatus is provided with an inlet flange 3 which is used for the introduction of an inert gas such as nitrogen to prevent the entrance of air when the reaction chamber is recharged. The interior of the chamber 5 is provided with an internally positioned heating device 4, which is provided with an appropriate temperature measuring means, for maintaining the temperature within the reaction chamber at a constant level. The dimethyl ester of the terephthalic acid which is formed within the reaction chamber is sublimed in the rapid current of the excess methanol and water vapors which are formed and the sublimed ester passes through the layer of activated carbon lying on the perforated plate 6 and is fed to the collection chamber 12 which is provided with a slider or scraper, the ester being precipitated in the cooled space 14. The methanol vapors escaping from the vessel 12 are condensed in condenser 15. The dimethyl ether which passes in the vapor phase through the condenser 15 is separately condensed by vigorous cooling and it, too, is returned to the methanol storage vessel 9.

500 parts of terephthalic acid are converted into the dimethyl ester during a period of from 3 to 4 hours. The dimethyl terephthalate collected in the vessel 14 may be stripped of methanol by filtration and desiccation and obtained in the form of a finely crystallized powder having a melting point of 139.5° C. The yield of this crude dimethyl terephthalate is 96% of the theoretical.

Example 2

The apparatus of Fig. 1 described in Example 1 may be used to produce the diglycol ester of terephthalic acid:

$$HO(CH_2)_2OOCC_6H_4COO(CH_2)_2OH$$

In this case the reaction vessel is maintained at an internal temperature of 280° C. and the ethylene glycol fed thereto in the vaporized state at a temperature of 270° C. The ethylene glycol is fed in at the rate of 600 grams per hour. 482 grams of the diglycol ester of terephthalic acid are separated from the ethylene glycol which condenses in the collection vessel, only a small portion of the ester being precondensed. The ester can be recovered in pure form after being freed from the excess glycol by recrystallization from water or acetone.

Example 3

Employing the apparatus shown diagrammatically in Fig. 2, for the manufacture of diethyl terephthalate, 500 grams of terephthalic acid are fed into a reaction chamber 20 of enameled iron having a capacity of 2 liters. This chamber is provided with a gas inlet pipe 21 which communicates with a perforated plate 22 positioned at the bottom of the chamber. The pipe 21 serves for the admission of ethanol in the vaporized state. The chamber is further provided with a charging flange 23 and a discharge pipe 24, the latter being heated to 140° C., through which the ester formed passes into the collection vessel 25, provided with a condenser 26. The reaction chamber is heated to 250° C. while a current of ethanol in the vaporized state, heated to 240° C., is conducted through the reaction mixture at a rate of 170 grams per hour. The diethyl terephthalate resulting from the esterification distills in a rapid flow from the reaction chamber while fresh terephthalic acid is fed to the reaction chamber through the inlet flange 23 at the same rate as the ester is formed. 142 grams of terephthalic acid are converted into the ethyl ester during a period of 8½ hours. The yield of the diethyl terephthalate is 91% of the theoretical.

Example 4

Employing the apparatus described in Example 3, dimethyl adipate is prepared by heating the reaction chamber of the apparatus to 250° C. and charging it with molten adipic acid. 170 grams of methanol vapors, at a temperature of 240° C., are introduced per hour into the reaction chamber. During 7 hours, 1540 grams of adipic acid are reacted. The excess methanol is removed from the dimethyl adipate by distillation. The ester is obtained in a yield of 87% of the theoretical.

Example 5

Employing the apparatus described in Example 3, the dimethyl ester of sebacic acid is prepared by heating the reaction chamber of the apparatus to 250° C. and charging it with molten sebacic acid. 195 grams of methanol vapors at a temperature of 240° C. are introduced per hour into the reaction chamber. During 6 hours, 873 grams of sebacic acid are reacted. The dimethyl ester of sebacic acid is obtained in a yield of 54% of the theoretical.

What is claimed as new, and desired to be covered by Letters Patent, is:

I claim:

1. Method of manufacturing esters of terephthalic acid which comprises reacting terephthalic acid in the granular state with an alcohol in the vajor state at a temperature of from about 100° to 310° C., thereby to produce the ester in the vapor state, and moving the ester in the vapor state from the zone of formation into a zone of lower temperature wherein the ester undergoes condensation.

2. Method of manufacturing esters of terephthalic acid which comprises reacting terephthalic acid in the granular state with an alcohol in the vapor state at a temperature of from about 100° to 310° C., in the presence of a catalyst, thereby to produce the ester in the vapor state, and moving the ester in the vapor state from the zone of formation into a zone of lower temperature wherein the ester undergoes condensation.

3. Method of manufacturing esters of terephthalic acid which comprises reacting terephthalic acid in the granular state with an alcohol in the vapor state at a temperature of from about 100° to 310° C., in the presence of a catalyst which is a member of the group consisting of phosphoric acid, zinc chloride, boro phosphate and phosphoric acid-carbon, thereby to produce the ester in the vapor state, and moving the ester in the vapor state from the zone of formation into a zone of lower temperature wherein the ester undergoes condensation.

4. Method of manufacturing esters of terephthalic acid which comprises reacting terephthalic acid in the granular state with an alcohol in the vapor state at a temperature of from about 100° to 310° C., the said granules being moistened with a catalyst, thereby to produce the ester in the vapor state, and moving the ester in the vapor state from the zone of formation into a zone of lower temperature wherein the ester undergoes condensation.

5. Method of manufacturing esters of terephthalic acid which comprises reacting terephthalic acid in the granular state with a monohydric alcohol in the vapor state at a temperature of from about 100° to 310° C. in the presence of a catalyst, thereby to produce the ester in the vapor state, and moving the ester in the vapor state from the zone of formation into a zone of lower temperature wherein the ester undergoes condensation.

6. Method of manufacturing esters of terephthalic acid which comprises reacting terephthalic acid in the granular state with a polyhydric alcohol in the vapor state at a temperature of from about 100° to 310° C. in the presence of a catalyst, thereby to produce the ester in the vapor state, and moving the ester in the vapor state from the zone of formation into a zone of lower temperature wherein the ester undergoes condensation.

7. Method of manufacturing esters of terephthalic acid which comprises reacting terephthalic acid in the granular state with an alcohol in the vapor state at a temperature of from about 100° to 310° C., the vapors of the alcohol when introduced into the reaction zone being that of the reaction temperature, said reaction taking place in the presence of a catalyst, thereby to produce the ester in the vapor state, and moving the ester in the vapor state from the zone of formation into a zone of lower temperature wherein the ester undergoes condensation.

8. Method of manufacturing dimethyl terephthalate which comprises reacting terephthalic acid in the granular state, in a reaction zone at a temperature of about 250° C. with vapors of methanol at a temperature of about 250° C., thereby to produce dimethyl terephthalate in the vapor state, and moving said vapors of dimethyl terephthalate from the zone of formation into a zone of a lower temperature wherein the said ester undergoes condensation.

9. Method of manufacturing dimethyl terephthalate which comprises reacting terephthalic acid in the granular state, the granular acid being moistened with phosphoric acid, in a reaction zone at a temperature of about 250° C. with vapors of methanol at a temperature of about 250° C., thereby to produce dimethyl terephthalate in the vapor state, and moving said vapors of dimethyl terephthalate from the zone of formation into a zone of a lower temperature wherein the said ester undergoes condensation.

10. Method of manufacturing diethyl terephthalate which comprises reacting terephthalic acid in the granular state in a reaction zone at a temperature of about 250° C. with vapors of ethanol at a temperature of about 240° C., thereby to produce diethyl terephthalate in the vapor state, and moving said vapors of diethyl terephthalate from the zone of formation into a zone of a lower temperature wherein the said ester undergoes condensation.

References Cited in the file of this patent

UNITED STATES PATENTS

| | | |
|---|---|---|
| 2,464,768 | Redmon | Mar. 15, 1949 |
| 2,578,312 | Miller et al. | Dec. 11, 1951 |
| 2,644,009 | Cash et al. | June 30, 1953 |

OTHER REFERENCES

Groggins: "Unit Process in Organic Synthesis," page 616, 4th ed. 1952.